United States Patent [19]

Subramanian

[11] Patent Number: 5,430,068
[45] Date of Patent: Jul. 4, 1995

[54] RECOVERY OF POLYAMIDE USING A SOLUTION PROCESS

[75] Inventor: Pallatheri M. Subramanian, Hockessin, Del.

[73] Assignee: E. I. Du Pont de Nemours and Company, Wilmington, Del.

[21] Appl. No.: 157,519

[22] Filed: Nov. 24, 1993

[51] Int. Cl.⁶ ............................................. C08J 11/04
[52] U.S. Cl. .................................... 521/40; 521/40.5; 521/47; 528/491; 528/497; 528/501
[58] Field of Search .................... 521/40, 40.5, 47; 528/491, 497, 501

[56] References Cited

U.S. PATENT DOCUMENTS 2,639,278  5/1953  Stott et al. .................. 528/490
3,006,867 10/1961  Simon ........................ 521/49.8
5,198,471  3/1993  Nauman et al. ............... 521/46.5

FOREIGN PATENT DOCUMENTS 788009   6/1968  Canada.
54-99173  8/1979  Japan.
1009592 11/1965  United Kingdom.

Primary Examiner—Paul R. Michl
Assistant Examiner—P. Hampton-Hightower

[57] ABSTRACT

Polyamide is recovered by an improved solution process and with minimal polyamide degradation.

3 Claims, No Drawings

RECOVERY OF POLYAMIDE USING A SOLUTION PROCESS

BACKGROUND OF THE INVENTION

Aliphatic polyamides, particularly nylon 6 and nylon 6,6 are extensively used for a variety of industrial and consumer applications such as carpets and automotive parts. Recycling and recovery of polymer from these products is important for environmental reasons. Such recovered polyamide material need to be separated from foreign materials such as carpet backing, etc. While there are several approaches to reclamation by chemical means wherein waste nylon is broken down to low molecular weight polymer or monomers which can be purified and reused to make high quality polyamide, these routes are expensive. It would be desirable to isolate the polymer with little, if any, loss of molecular weight by some other techniques.

Aliphatic polymers, in general, are soluble in selected solvents and thus a solutioning process could offer a route to recycle/recover polymers. The solvents for nylon are polar, often reactive and need to be handled with extreme caution for safety reasons. From a processing point of view, solvents that dissolve polyamides at elevated temperatures at atmospheric pressure, and from which the polymer precipitates on cooling and can be isolated by filtration are preferred. Certain polyols and carboxylic acids are such solvents, however, they are reactive and contribute to degradation of molecular weight of the polyamide. While some loss in molecular weight can be tolerated, severe degradation makes the product unsuitable for extrusion purposes (e.g. fibers and films) and as a molding compound. The present invention is directed to alleviation of this problem.

SUMMARY OF THE INVENTION

This invention provides a novel process for recovering aliphatic polyamide from admixtures with foreign materials comprising (1) dissolving the polyamide in a substantially anhydrous polyol or aliphatic carboxylic acid having from 2 to 6 carbon atoms at an elevated temperature; (2) separating any insoluble foreign material from the polyamide solution; (3) and combining the polyamide solution with an additional quantity of substantially the same solvent at a temperature sufficiently below said solution temperature to quench the solution and cause the polyamide to precipitate; and (4) recovering the polyamide precipitate.

DETAILED DESCRIPTION OF THE INVENTION

The process of the invention involves solution recovery of aliphatic polyamide in a relatively undegraded state from admixtures with foreign materials present in scrap or waste products. The foreign material may be carpet backing, reinforcing fiber such as glass fiber, other polymers; etc. The polyamide such as polyhexamethylene adipamide and polycaproamide etc., may contain minor amounts of aromatic units within the polymer chain provided that such inclusions do not interfere with the solubility characteristics needed for practice of the invention. More than one aliphatic polyamide may be present and removed by the present process. The polyamide of the admixture with foreign material is dissolved in a substantially anhydrous polyol such as ethylene glycol (EG) or propylene glycol (PG) or in a substantially anhydrous aliphatic carboxylic acid having from 2 to 6 carbon atoms such as acetic and propionic acids in a quantity and at a temperature sufficiently high to dissolve the polyamide. By "substantially anhydrous" is meant there is insufficient water present which might interfere with the recovery process. Water reduces the ability of the polyol and the acid to dissolve the polyamide. The solution is then separated from the foreign materials as by filtration or decanting.

Since the solvents are reactive, they tend to degrade the polymer thereby reducing the molecular weight and possibly rendering the polymer unsuitable for certain end-uses. In order to minimize molecular weight loss, it is important to rapidly dissolve the polyamide in the solvent and then to rapidly cool or quench the hot solution to precipitate the polyamide from the solution. The rapid cooling, in accordance with this invention, is achieved by combining the hot solution with a quantity of the same solvent but which is at a much lower temperature. As the temperature of the combined liquids falls below the temperature at which the polyamide is soluble in the solvent employed, the polyamide precipitates and may be recovered by filtration or by other techniques. By control of quench solvent temperature, it is possible to attain any temperature between that of the quench solvent and the hot solution. Since the solubilities of different polyamides such as nylon 6 and 6,6 are different, this technique enables the precipitation of a particular polyamide where more than one is present in the solution while keeping the other polyamide in solution for subsequent precipitation.

The advantages of quench cooling with the same solvent are significant. First, the cooling is achieved rapidly thereby reducing the time of exposure of the polymer to the solvent at the elevated solution temperature with attendant degradation. Second, since the same solvent is used for quenching, recovery of the solvent for reuse is simplified and does not require separation of solvent from the quench liquid which would be a costly solvent recovery process.

EXAMPLES

The following experiments show the decrease in molecular weight caused by exposure of a nylon solution in glycol at the boiling point of the glycol. Long time exposure of the dissolved nylon under these circumstances is shown to reduce the molecular weight significantly.

Example 1

15 grams of polyhexamethylene adipamide (Zytel ® 101 made by DuPont) was added to a round- necked flask (250 ml capacity) equipped with a stirrer, reflux condenser, nitrogen atmosphere and containing 135 g of ethylene glycol under reflux (~190° C.). The nylon was kept in solution at this temperature for various periods of time. A similar series was run using propylene glycol as solvent. At the prescribed time, the assembly was disconnected and the solution was filtered and precipitated by pouring into a blender containing 700 ml of room temperature water. The separated solids were then filtered through a Buchner funnel and washed with distilled water (300 ml). The recovered solids were dried in a vacuum oven kept at 85° C.

The relative viscosity (R.V.) of the polymer (a measure of molecular weight) was determined at room temperature by measuring the time of flow in a viscometer, of a 10% solution of the polyamide in formic acid and comparing it to the viscosity of the pure solvent.

| Exposure Minutes | Relative Viscosity | Glycol |
|---|---|---|
| 8 | 34.52 | EG |
| 30 | 19.33 | EG |
| 60 | 12.74 | EG |
| 120 | 4.89 | EG |
| 240 | 2.41 | EG |
| 8 | 43.09 | PG |
| 30 | 37.83 | PG |
| 60 | 30.90 | PG |
| 120 | 22.31 | PG |
| 240 | 14.71 | PG |
| Control untreated | | |
| NYLON 66 | 48.47 | |

Example 2

In the following experiments waste nylon about 35 R.V. from a used automotive radiator was used.

A—270 g of ethylene glycol was heated to about 180° C. and 52 g of ground nylon from an automotive radiator (contains 33% glass fibers) was added to give an approximately 10% solution. The admixture was stirred for minutes and the temperature raised to 187° C. The slurry containing the nylon and the inorganic fillers was filtered through a preheated Buchner funnel using vacuum into a vessel containing 27 g of ethylene glycol at about 0° C. The nylon precipitated rapidly. The contents of the vessel were allowed to cool to about 40° C., and filtered. The recovered nylon was washed with cold water and dried. The filtrate from the first quench system was kept separately, for purification.

B—Experiment A was repeated, except that the quench glycol was at room temperature. The nylon was isolated as before.

C—Experiment A was repeated, this time keeping the glycol used for quenching at 100° C. (the 66 nylon comes out of glycol at around 150°-160° C.). The resultant temperature was about 130° C. and the nylon precipitated. It was washed with methanol and water and dried.

In the above experiments the dissolution and precipitation was carried out in about 30 minutes.

The viscosities of the different samples of recovered nylon were determined as before. These are given below.

| Run Number | RV |
|---|---|
| A | 31.83 |
| B | 29.64 |
| C | 30.43 |

These data show that precipitation of the nylon by rapid quenching with the same solvent recovers the nylon with minimum loss in molecular weight.

In another experiment, glacial acetic acid was used as a solvent for the nylon. This carboxylic acid also tends to degrade nylon 6,6 and lower the molecular weight. However by rapid dissolution followed by quenching with cold acetic acid the nylon could be purified and recovered with little loss of molecular weight. The following experiments show the utility of this technique in recovering nylon using acetic acid as solvent.

Example 3

To a 250 ml round bottom flask, equipped with a stirrer, condenser, thermocouple and a nitrogen atmosphere, was added 117 g of glacial acetic acid. After heating to reflux at 118° C., 13 g of brown nylon carpet fibers (nylon 6,6) about 60 R.V., were added and allowed to dissolve by heating for 3 minutes. The solution was filtered under vacuum through a 115 mm diameter filter funnel with a Whatman #1 filter paper. The funnel had been preheated to about 165° C. to avoid cooling and precipitation of the nylon from the acetic acid solution. The receiving flask contained 117 g of room temperature (about 23° C.) acetic acid. The nylon precipitated from the hot solution on contact with the cold acetic acid in the flask. The resulting temperature upon combination of the liquids was about 37° C. The precipitated nylon, as a slurry with the acetic acid, was filtered under vacuum through a 3000 ml Buchner funnel. The nylon cake was transferred to a Waring blender and washed with 300 ml of deionized water. The washed nylon was again filtered to remove the water, then dried in a vacuum oven.

The recovered nylon was found to have a RV of 59.9, indicating that quenching permits recovery of nylon product with minimal degradation.

Example 4

The process of the invention was applied to nylon 6,6 (Zytel ® 101) and to nylon 6,6 from a used automotive radiator. The relative viscosities of the resulting products were compared with those of Zytel ® 101 and of the nylon part.

| | RV |
|---|---|
| Zytel ® 101 | 50 |
| Zytel ® 101/Dissolved in acetic acid, quenched and recovered | 51 |
| Nylon from automotive radiator | 35 |
| Nylon from automotive radiator dissolved in acetic acid, quenched and recovered | 38 |

Within experimental error, these data show that these techniques can recover nylon without significant reduction in molecular weight.

I claim:

1. A process for recovering aliphatic polyamide from admixtures thereof with foreign materials comprising the steps of:
   (1) dissolving the polyamide at an elevated temperature in a solvent selected from the group consisting of a substantially anhydrous ethylene glycol, propylene glycol, and aliphatic carboxylic acid having from 2 to 6 carbon atoms;
   (2) separating any insoluble foreign material from the polyamide solution;
   (3) combining the polyamide solution with an additional quantity of substantially the same solvent at a temperature sufficiently below the temperature of the solution to quench the solution and cause the polyamide to precipitate; and
   (4) recovering the polyamide precipitate.

2. A process according to claim 1 wherein the polyamide is poly(hexamethylene adipamide).

3. A process according to claim 1 wherein the solvent is substantially anhydrous acetic acid.

* * * * *